US010373355B1

(12) United States Patent
Jones

(10) Patent No.: US 10,373,355 B1
(45) Date of Patent: *Aug. 6, 2019

(54) DENSITY GRADIENT ANALYSIS TOOL

(71) Applicant: Wells Fargo Bank, N.A., San Francisco, CA (US)

(72) Inventor: Christopher J. Jones, Roseville, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,327

(22) Filed: Jan. 4, 2019

Related U.S. Application Data

(63) Continuation of application No. 15/686,623, filed on Aug. 25, 2017, now Pat. No. 10,176,610, which is a continuation of application No. 14/461,782, filed on Aug. 18, 2014, now Pat. No. 9,773,328.

(51) Int. Cl.
*G06T 11/20* (2006.01)

(52) U.S. Cl.
CPC .................. *G06T 11/206* (2013.01)

(58) Field of Classification Search
CPC .............. G06T 11/206; G06F 19/26
See application file for complete search history.

(56) References Cited

U.S. PATENT DOCUMENTS

| | | |
|---|---|---|
| 2002/0118192 A1 | 8/2002 | Couckuyt et al. |
| 2005/0237341 A1 | 10/2005 | Gangnet et al. |
| 2014/0122443 A1 | 5/2014 | Gullin |
| 2015/0254369 A1 | 9/2015 | Hou et al. |
| 2015/0363070 A1 | 12/2015 | Katz |

OTHER PUBLICATIONS

Blascheck, et al. "Circular heat map transition diagram." Proceedings of the 2013 Conference on Eye Tracking South Africa. ACM, Aug. 29-31, 2013.

*Primary Examiner* — Ke Xiao
*Assistant Examiner* — Jed-Justin Imperial
(74) *Attorney, Agent, or Firm* — Walter Haverfield LLP; James J. Pingor

(57) ABSTRACT

Systems, methods, and other embodiments associated with density gradient analysis tool for heat mapping systems. According to one embodiment, a method includes receiving data points. The method further includes calculating a data distribution of the data points. The data distribution has bins, and the bins represent an interval of time. The method further includes rendering a heat map based, at least in part, on the data distribution. The heat map includes regions corresponding to the bins.

20 Claims, 8 Drawing Sheets

DENSITY GRADIENT ANALYSIS TOOL

CROSS-REFERENCE TO RELATED APPLICATIONS

This application is a continuation of and claims priority to U.S. Non-Provisional patent application Ser. No. 15/686,623 entitled "DENSITY GRADIENT ANALYSIS TOOL", filed on Aug. 25, 2017, which is a continuation of and claims priority to U.S. Non-Provisional patent application Ser. No. 14/461,782 entitled "DENSITY GRADIENT ANALYSIS TOOL", filed on Aug. 18, 2014, now U.S. Pat. No. 9,773, 328; the entirety of the above-noted application is incorporated by reference herein.

BACKGROUND

A heat map is a graphical representation of data points. Each data point is associated with a value. For example, data points regarding marathon runners may include values corresponding to finish times for the marathon runners. Different values of the data points are assigned colors. Accordingly, each data point in the heat map has a color corresponding to the value of that data point. The resulting heat map appears as a multi-colored area of all of the data points. Given the vast amounts of data that most endeavors generate and use, heat maps may be difficult to interpret. For example, a single heat map may have thousands of data points in dozens of colors. Even if the colors of each data point can be discerned, the heat map may not visually aid the viewer in identifying issues (e.g., data points, data thresholds, data trends). Thus, typical heat maps do not convey information about the represented data efficiently.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

The more data a heat map includes, the more difficult it may be to assess the data being presented and identify issues in the data. Described herein are examples of systems, methods, and other embodiments associated with heat maps utilizing density gradient analysis. By using density gradient analysis to calculate data distributions, the resulting heat map can be organized according to a specified characteristic. Thus, the resulting heat maps visually aid the viewer in identifying issues.

The systems, methods, and other embodiments described herein calculate data distributions using received data. The data distributions organize the data according to a specified characteristic. For example, data regarding an amount of activity occurring on servers may be organized in a data distribution using statistical density gradient analysis methods. By arranging the data in a statistically relevant data distribution, the resulting heat map more efficiently illustrates the data such that issues, like a time interval during which the servers are overburdened, can be more easily identified. Thus, by removing ambiguity and the unknown from data analysis, the issues in the data are more easily identifiable in a heat map. Accordingly, reviewing a heat map does not need to be relegated to team of people specifically trained in complex statistical analysis. Instead, a common user may efficiently review the data analysis from a density gradient analysis tool to identify issues in the data.

The following description and drawings set forth certain illustrative aspects and implementations. These are indicative of but a few of the various ways in which one or more aspects may be employed. Other aspects, advantages, or novel features of the disclosure will become apparent from the following detailed description when considered in conjunction with the drawings.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
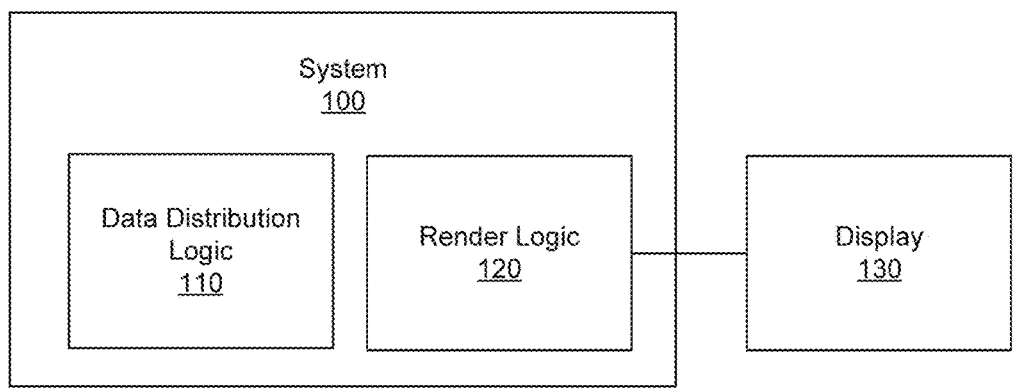
FIG. 1 illustrates one embodiment of a system associated with a density gradient analysis tool.

Embodiments or examples illustrated in the drawings are disclosed below using specific language. It will nevertheless be understood that the embodiments or examples are not intended to be limiting. Any alterations and modifications in the disclosed embodiments and any further applications of the principles disclosed in this document are contemplated as would normally occur to one of ordinary skill in the pertinent art. Described herein are examples of systems, methods, and other embodiments associated with utilizing a density gradient analysis tool in heat mapping.

FIG. 1 illustrates one embodiment of a system 100 associated with a density gradient analysis tool. The system 100 includes a data distribution logic 110 and a render logic 120. They system 100 may be implemented in a computer system used for data analysis and display. For example, the render logic 120 may be associated with a display 130.

The data distribution logic 110 receives data. As discussed above, large amounts of data may be received as data points. The data points may represent a number of characteristics. The data may be sent to the data distribution logic 110 in response to a user requesting or selecting a visualization of the data. Using the received data, the data distribution logic 110 calculates a data distribution. In one embodiment, calculating the data distribution involves processing the data to organize the data points according to specified characteristics.

Suppose that data measuring the capacity variability for servers is received by the data distribution logic 110. For example, a data point corresponds to an activity on a server. The specified characteristic of each data point may be the time the activity on the server occurred. Because each data point is associated with a value of time when the activity occurred, the data can be organized according to the specified characteristic of the value of time.

In one embodiment, the data distribution logic 110 divides the data points into groups, referred to herein as "bins." In the example given, the data distribution logic 110 organizes the data points into twelve bins, each bin representing a two hour interval in a day. Accordingly, a data point that represents an activity that occurred on a server between midnight and 2 o'clock a.m. may be placed in a first bin. Likewise, a data point that represents an activity that occurred on a server between 2 o'clock a.m. and 4 o'clock a.m. may be placed in a second bin, and so on. The number of data points in a bin is referred to as the density of the bin. Because each bin represents the same interval, two hours, the number of data points in each bin can be used to compare the bins. Thus, the data distribution clarifies the density of a bin with regard to the other bins.

The render logic 120 uses the data distribution to render a heat map. In the described embodiment, the heat map illustrates the density of data points by bin according to the data distribution. The heat map may take any shape (e.g., ellipse, square, rectangle, etc.). As will be discussed in detail below, the heat map may be rendered in a circular shape, such as a ring or torus. In the example of the ring, the render logic 120 is configured to determine the bounds of the heat map. For example, the bounds may be defined by the render logic 120. Alternatively, a viewer may set the bounds of the heat map. A viewer may also wish to specify a margin.

In this example, the render logic 120 defines the outer radius according to the bounds. For example, the diameter is equal to the bounds subtracted by two times the margin. The outer radius is the diameter divided by two. The inner radius may be predetermined or be defined by the viewer. For example, the inner radius may be defined as being ten pixels interior to the outer radius. Accordingly, the render logic 120 renders a ring for the heat map.

The render logic 120 then divides the ring into a number of sections corresponding to the number of bins. In the example given above there are twelve bins. Thus, the ring is divided into twelve 30 degree arc shaped sections. The render logic 120 illustrates a data point in a section of the circular heat map corresponding to the bin of the data point in the data distribution. Once the data points have been applied to corresponding sections of the circular heat map, the circular heat map can be rendered on the display 130.

The embodiment described with respect to the data distribution logic 110 dividing the data points into twelve bins is given as example to illustrate the functionality of the system 100. Alternative embodiments may be implemented with more or fewer bins having a corresponding shorter or longer intervals respectively. For example, the number of bins to be used may not be pre-determined. Instead, the data distribution logic 110 may receive data for a twenty-four hour period and determine an interval that defines the bin size based on the distribution of the data. In one example, the bin size may be defined based on the amount of data received. Accordingly, in this example, the bin size may have a default value such that an interval is two hours, but based on the amount of data received, the data distribution logic 110 may redefine the interval as fifteen minutes for a total of 96 bins. In another embodiment, the number of bins may reach as high as 360 bins, each bin having an interval of 4 minutes. If the data distribution logic 110 determines that a shorter interval would efficiently illustrate the data, the data distribution logic 110 may aggregate data points in the bins.

In an embodiment in which the distribution logic 110 aggregates data points in the bins, aggregation refers to calculating a count, sum, average, standard deviation, etc. for the data points. For example, the data points may represent multiple characteristics such as time an activity on a server originated, duration of the activity, input/output ports used to conduct activity on a network. While each characteristic can be used individually, the characteristics may be alternatively aggregated to generate a single quantitative value for the data point. Accordingly, the data can be manipulated within the data distribution to highlight specific characteristics of the data points or manipulated to give an overall analysis of aggregated characteristic.

Figure 2:
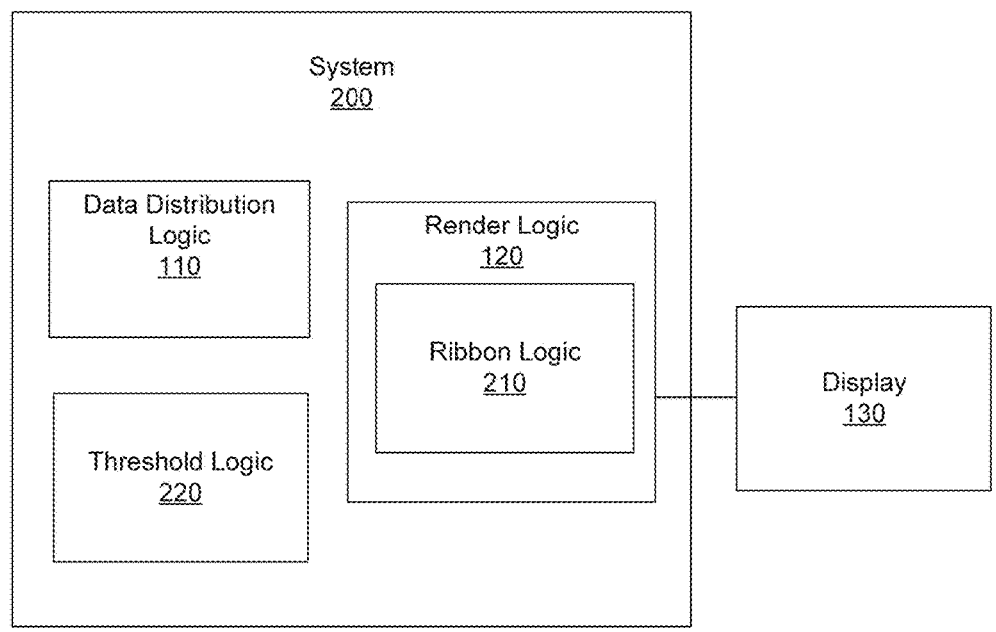
FIG. 2 illustrates one embodiment of a system associated with a density gradient analysis tool having a ribbon logic and a threshold logic.

FIG. 2 is an illustration of one embodiment of a system 200 associated with a density gradient analysis tool. The data distribution logic 110, the render logic 120, and the display 130 operate in a similar manner as described above with respect to FIG. 1. The render logic 120 includes a ribbon logic 210. The system 200 further includes a threshold logic 220. In some instances, a viewer may wish to view a larger data set. As discussed in the example above, the data distribution logic 110 organizes data points into twelve bins, each bin representing a two hour intervals in a day. In addition to the data points representing the day, a viewer may wish to view data points representing other days.

In one embodiment, the data points of circular heat map may be aggregated into bins in order to view data points corresponding to multiple days. For example the first bin of a first day may be combined with the first bin of a second day, and the first bin of a third day, and so on. The combined first bin may then reflect a count, sum, average, standard deviation, etc. of the data points in the combined first bin. Thus, here the corresponding bins for each day are aggregated to determine whether there are intervals within the day that consistently have similar characteristics. Accordingly, the data points may be aggregated to determine if there is a periodicity in the data. In the example given above in which the data points relate to server activity, aggregating the bins may illustrate times of day that the servers have increased activity. The aggregated data distribution can then be illustrated in the circular heat map.

Conversely, rather than aggregating the circular heat map, the circular heat may be transformed into a ribbon heat map. In one embodiment, the data distribution logic 110 receives a request to illustrate additional data points in combination with the data already illustrated in a heat map. In response to receiving the request to illustrate additional data, the data distribution logic 110 calculates an additional data distribution in order to organize the additional data points. For example, suppose that the circular heat map discussed above represents data points corresponding to a single day. The data distribution for the additional data includes new bins corresponding to the bins used in the data distribution of the first circular heat map. Accordingly, since the circular heat map is based on a data distribution having two hour intervals beginning at midnight, additional data representing a second day would be divided into a data distribution having bins also representing two hour intervals beginning at midnight on the second day.

To finish calculating the additional data distribution, the data distribution logic 110 places the data points in the appropriate bin. Once the data distribution logic 110 has calculated the additional data distribution, the render logic 120 renders a ribbon heat map. While here, we have describe aggregating bins per day, in other embodiments, bins may be aggregated based on any period of time. For example, the bins may be aggregated weekly to determine if there are days having similar characteristics, or bins may be aggregated monthly to determine if there are weeks having similar characteristics, and so on. Therefore, data illustrated in a ribbon heat map can be aggregated in a similar manner as data illustrated in a circular heat map.

In one embodiment, the ribbon logic 210 uses a data set to generate the ribbon heat map. For example, if a large data set is received the ribbon logic 210 may be configured to generate a ribbon map in order to illustrate multiple days of data. In another embodiment, the render logic 120 may have previously rendered a circular heat map. Accordingly, the ribbon logic 210 is configured to generate a ribbon heat map using a previously generated heat map. For example, the ribbon logic 210 transforms a first type of heat map (e.g., circular heat map) to a second type of heat map (e.g., ribbon heat map).

Suppose the first heat map is the circular heat map described above. Transforming the circular heat map to a ribbon heat map does not change the data distribution, rather the transformation alters the illustration of the circular heat map. Instead of being illustrated as a ring, the circular heat map is illustrated as a ribbon. In one embodiment, the ribbon is rendered as a wavelength of a sinusoidal wave. The render logic 120 renders the additional data in the same manner as the circular heat map. Consider that the circular heat map represented a single day and is transformed to be illustrated as a wavelength of a sinusoidal wave. If the additional data includes data points corresponding to multiple days, then each set of data points corresponding to one day is illustrated as one wavelength of the sinusoidal wave. Accordingly, the representation of data points in the ribbon heat map is a constant that visually defines the sets of data. Thus, by viewing the ribbon heat map, a viewer can easily identify issues in the sets of data, such as patterns.

Thresholds are used by the render logic 120 to visually aid a user viewing a resultant heat map. Specifically, a threshold logic 220 defines thresholds indicative of a critical mass of data point in a bin. With respect to the example in which data points are used to identify activity on a server, multiple threshold may be used to indicate a routine amount of activity on a server, a large amount of activity on a server, and a critical amount of activity likely to cause a server to fail. In one embodiment, a user can visually identify thresholds because the threshold logic assigns colors to the thresholds. Thus, when a heat map is illustrated, sections corresponding to bins are assigned colors. For example, a bin having enough data points to merit the critical amount of activity threshold may be illustrated in a section of a heat map and be colored red.

As discussed above, the threshold logic 220 determines thresholds the bins. In one embodiment, the threshold logic 220 may receive thresholds set by a viewer. Alternatively, the thresholds may be automatically set by the threshold logic 220 based on observed data. For example, in the example given above in which data points correspond to activity on a group of servers, the threshold logic 220 may determine the data distribution and the operation of the group of servers. For example, it may be of paramount concern to identify times in which the load on a server causes the server to fail. However, if the servers often run well below capacity, the servers will typically run below the point of failure. Accordingly, the threshold logic 220 may receive test data for the servers. In one example, the test data may demonstrate the amount of activity that has caused serves to fail during experimental use of the servers. The threshold logic 220 determines the point of failure for a server in the group of servers based on the results of the test data. Alternatively, a point of failure may be identified from customer feedback. Thus, the threshold logic 220 uses observed data to set the thresholds.

In one embodiment, the threshold logic 220 assigns a color to each section of a heat map to signify the density of data points in a corresponding bin. To determine what color should be assigned to a section, the threshold logic 220 determines which color corresponds to the number of data point in the bin. For example, the lower the number of data points in a bin, the lighter the color assigned to the corresponding section may be. Conversely, the higher the number of data points in a bin, the darker the color assigned to the corresponding section may be. In one embodiment, color is assigned based on a threshold value. For example, a viewer is concerned with the amount of activity on a server. Suppose that the table below enumerates data points in the first 12 bins that are indicative of activity on a server.

| Bin | 1 | 2 | 3 | 4 | 5 | 6 | 7 | 8 | 9 | 10 | 11 | 12 |
|---|---|---|---|---|---|---|---|---|---|---|---|---|
| Events | 0 | 0 | 1 | 4 | 7 | 16 | 17 | 14 | 5 | 1 | 0 | 0 |
| Color | Gr | Gr | Gr | Yl | Yl | Rd | Rd | Rd | Yl | Gr | Gr | Gr |

The first row identifies bins that correspond to two hour intervals. For example, the first bin represents an interval between 12 o'clock a.m. and 2 o'clock a.m. The "Events" row represents the number of data points in a bin, each data point representing an activity that occurred on a server. For example, there are zero data points in bin 1. Accordingly, there was no activity on the server between midnight and 2 o'clock. The third row represents colors assigned to each bin based on the number of events in the related bin. For example, Gr indicates green, Yl indicates yellow, and Rd indicates red. Thus, bin 1 is assigned a green color, bin 4 is assigned a yellow color, and bin 6 is assigned a red color. As discussed above, the threshold logic 220 assigns colors based on the number of data points in a specified bin. In one embodiment, this is a threshold value. For example, if a bin contains 0-3 data points, the color green is assigned, if the bin contains 4-8 data points, the color yellow is assigned, and if there are greater than 9 data points in the bin, the color red is assigned to the bin.

In the example given in which data points correspond to activities on a group of servers, the thresholds may change if a server is down. For example, if a server is down, the thresholds dynamically change such that if a bin contains 0-1 data points, the color green is assigned, if the bin contains 2-4 data points, the color yellow is assigned, and if there are greater than 5 data points, the color red is assigned to the bin. Accordingly, the threshold logic 220 may redefine thresholds based on the observed data regarding operation of the server. Thus, the visual representation of the heat map may change in accordance with present circumstances so that the heat map is a dynamic representation of the data points.

Figure 3A:
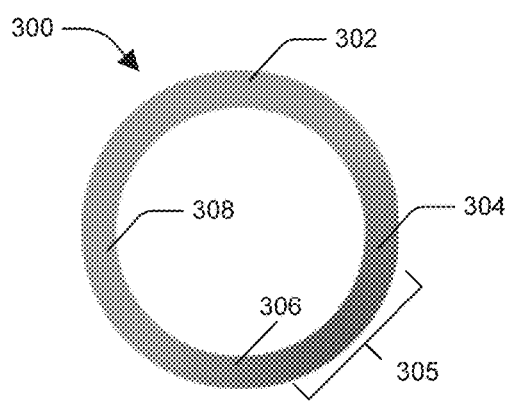
FIG. 3A illustrates one embodiment of a circular heat map related to the system associated with a density gradient analysis tool.

FIG. 3A illustrates one embodiment of a heat map 300 associated with a density gradient analysis tool as described above with respect to FIG. 1. As discussed above, the heat map may have a circular shape. In the example given with respect to FIG. 1, the data distribution logic organizes the data points into twelve bins, each bin representing a two hour interval in a day. Thus, the circular heat map 300 represents data points corresponding to a single day. Accordingly, the circular heat map 300 represents twenty-four hours rather than the twelve hours typically shown on a clock. For example, the top 302 of the circular heat map 300 corresponds to midnight, the right 304 of the circular heat map 300 corresponds to 6 o'clock a.m., the bottom 306 of the circular heat map 300 corresponds to noon, and the left 308 of the circular heat map 300 corresponds to 6 o'clock p.m.

The color gradations in the circular heat map 300 represent the density of data points occurring at the time signified by the position on the circular heat map 300. For example, in the example circular heat map 300 shown, a region 305 between the right 304 and the bottom 306 of the circular heat map 300 has a darker color than the remainder of the circular heat map 300. This color difference may correspond to an increased density of data points in the region 305. Accordingly, with reference to the example given above, if the data points correspond to activity on a server, the most server activity occurs between the hours of 6 o'clock a.m. and noon.

The top 302 of the circular heat map 300 is illustrated as an example of the manner in which the circular heat map 300 may be implemented. Different characteristic of the data points may be used to render the circular heat map 300. For example, rather than areas on the circular heat map 300 corresponding to times, the areas may corresponds to locations. Consider that a financial entity is tracking transactions in multiple locations. In this embodiment the top 302 of the circular heat map 300 corresponds to a first location, the right 304 of the circular heat map 300 corresponds to a second location, and the region 305 corresponds to locations between the first location and the second location. Thus, the circular heat map 300 may be used to illustrate a number characteristics of data.

Figure 3B:
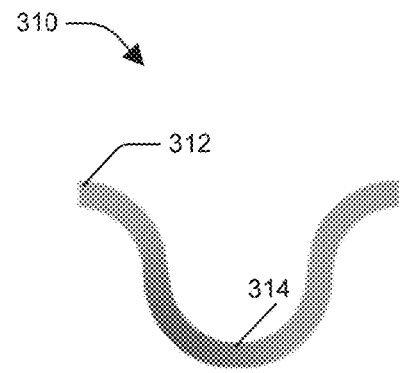
FIG. 3B illustrates one embodiment of a wavelength of a ribbon heat map related to the system associated with a density gradient analysis tool.

FIG. 3B illustrates one embodiment of a heat map associated with a density gradient analysis tool as described with respect to FIG. 2. As discussed above, the ribbon logic 210 of FIG. 2 is configured to transform a heat map into a ribbon heat map. For example, FIG. 3A illustrates a circular heat map 300. FIG. 3B illustrates a ribbon heat map 310 that is the result of transforming the circular heat map 300 to the ribbon heat map 310. As discussed above, the transformation from a circular heat map to a wavelength of a sinusoidal wave does not affect the data distribution. Instead, the transformation affects the manner in which the data distribution is illustrated. Furthermore, a circular representation or a wavelength of a sinusoidal wave shows 24 hours, the ribbon heat map discussed below with respect to FIG. 3C illustrates multiple 24 hour periods.

The ribbon heat map 310 is shown as a single wavelength of a sinusoidal wave. Accordingly, in the example given above with respect to FIG. 3A, as the top 302 of the circular heat map 300 represents midnight. Here, the first crest 312 of the ribbon heat map 310 corresponds to midnight. Likewise, in FIG. 3A the bottom 306 of the circular heat map 300 represents noon. Here, the trough 314 of the ribbon heat map 310 represents noon. The ribbon heat map 310 is illustrated as a wavelength as an example of the transformation performed by the ribbon logic 210. There are many alternative shapes (e.g., convex line, concave line, S-shaped line, scallop line, spiral line, circular, rectangular, triangular, etc.) into which the circular heat map 300 may be transformed.

Figure 3C:
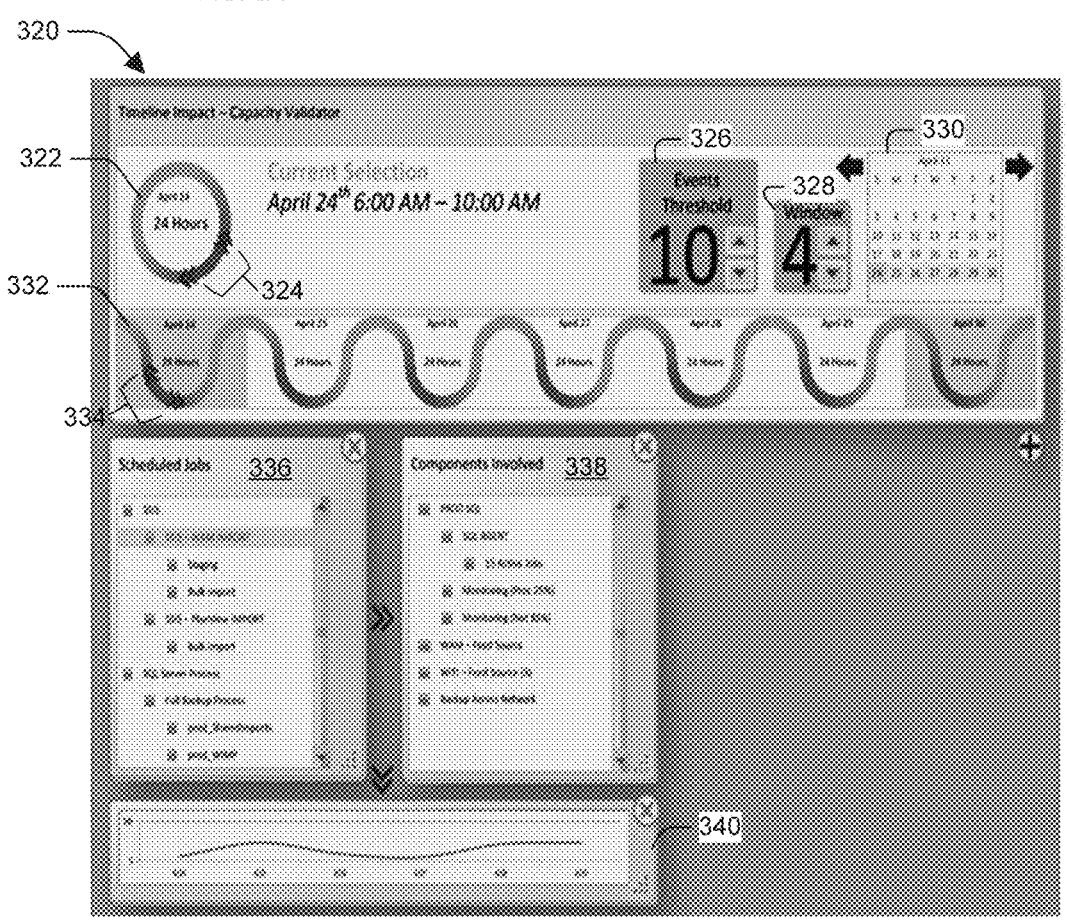
FIG. 3C illustrates one embodiment of a screen shot associated with a density gradient analysis tool.

FIG. 3C illustrates one embodiment of a screen shot 320 associated a with density gradient analysis tool. A circular heat map 322 may be used to demonstrate data for a 24 hour period. A viewer wishing to view a region in more detail can select the region. Here, a first selection 324 is shown between sets of chevrons on the circular heat map 322. Data about the first selection 324 is illustrated in the screen shot 320. For example, if the color of the first selection 324 is based on a threshold, a value corresponding to the threshold of the first selection 324 may be shown in an events threshold box 326. Additionally, a window box 328 identifies an interval associated with the first selection 324. For example, if the region of the first selection 324 corresponds to a four hour interval, a "4" would be displayed in the window box 328. In an embodiment in which the circular heat map 322 corresponds to a 24 hour period, a calendar 330 illustrates the day corresponding to the 24 hour period.

The circular heat map 322 may be rotated to transition between days. For example, in one embodiment, a circular heat 322 map utilizes touch screen functionality. A user may rotate (i.e., wind) the circular heat map 322 by touching the screen. Accordingly, a user viewing a first day may rotate the circular heat map 322 two 360 degree rotations to view a circular heat map representing a third day. Alternatively, a user may use a display device (e.g., keyboard, mouse) to rotate the circular heat map 322.

In one embodiment, the circular heat map 322 represents data for a 24 hour period that is a subset of a longer period of time. The longer period of time may be represented in a ribbon heat map 332. As shown, the ribbon heat map 332 has a second selection 334 that corresponds to the same data represented in the first selection 324. Thus, the screen shot 320 is an example of the manner in which a circular heat map 322 and a ribbon heat map 332 may be used in combination to illustrate data. For example, multiple wavelengths may be used to illustrate multiple days on the ribbon heat map 332. The periodic nature of the sinusoidal wave aids efficient reading of the heat map as the top half of the sinusoidal wave corresponds to night hours, and the bottom half of the sinusoidal wave corresponds to daylight hours. This bifurcation between night and day is also illustrated to the circular heat map as shown in FIG. 3A.

In one embodiment, when a wavelength of the ribbon heat map 332 is selected, the corresponding circular heat map 322 is also displayed. For example, if the second selection 334 is selected from the heat map, the corresponding 24 hour region having the second selection 334 will be displayed. As discussed above, the screen shot 320 may be displayed on a touch screen. In addition to using the functionality described herein using touch screen technology, a user may freeze the screen shot 320 or components of the screen shot 320 (e.g., the circular heat map 322, the ribbon heat map 332) to keep a user from accidentally changing the view.

Figure 3D:
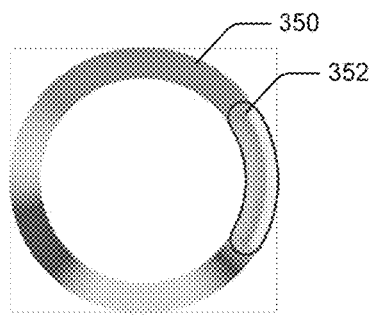
FIG. 3D illustrates one embodiment of a circular heat map having a snap bubble associated with a density gradient analysis tool.

FIG. 3D illustrates one embodiment of a circular heat map 350 having a snap bubble 352 associated with a density gradient analysis tool. A user may wish to only display a certain range of information or zoom in on a specific region. For example, as shown above with respect to FIG. 3C the first selection 324 and the second selection 334 are illustrated between sets of chevrons. In another embodiment, a range of data is selected using a snap bubble 352. The snap bubble 352 is a border drawn around a subset of data that the user wishes to view. The snap bubble 352 can then be stretched to any size to compass a desired region of a heat map. The snap bubble may be transparent, translucent, or opaque. Here, the snap bubble 352 is illustrated on circular heat map 350, however, a snap bubble may be used in conjunction with other types of heat maps, such as the ribbon heat map 332 of FIG. 3C.

In one embodiment, in response to a snap bubble 352 being drawn around the subset of data, the remainder of the set of data may be cropped from a ribbon heat map. In one example, only the subset of data from the snap bubble 352 is displayed. Alternatively, the subset of data from the snap bubble 352 may be shown to a greater degree of granularity thereby effectively zooming in on the subset of data. In another embodiment, double clicking on the snap bubble 352 allows for the removal of data outside of the snap bubble 352. Accordingly, in the example described above with respect to the circular heat map 350, double clicking the snap bubble 352 would cause the twenty-four hour view to be displayed. Double clicking inside the twenty-four view would then reset the display to the full ribbon heat map. Thus, numerous tools may be used to enhance a user's ability to view and manage data.

Figure 3E:
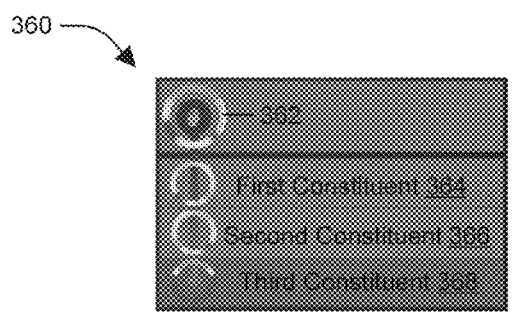
FIG. 3E illustrates one embodiment of a multi-characteristic view of a circular heat map associated with a density gradient analysis tool.

FIG. 3E illustrates one embodiment of a multi-characteristic view 360 of a circular heat map associated with density gradient analysis. Consider that a user wishes to view the constituents of a heat map. For example, a user may wish to view the constituents of a portion 362 of a circular heat map. In one embodiment, selecting a portion 362 of a circular heat map may cause constituents such as a first constituent 364, a second constituent 366, and a third constituent 368 to be displayed. In one embodiment, the constituents are displayed using drop down functionality (i.e., drop down menu).

The constituents may be determined based on characteristics of the data represented in the portion 362. For example, as described above with respect to FIG. 2, regions of a circular heat map may be assigned a color based on the density of data points in the region. Accordingly, the constituents may be separated based on the density of the data points. Thus, the constituents may be represented as having the different colors corresponding to the different colors of the regions. For example, the first constituent 364 may colored green, the second constituent 366 may be colored yellow, and the third constituent 368 may be colored red. Accordingly, a user can visually identify a constituent of the portion 362 of the circular heat map by the color of the constituent. Additionally or alternatively, the constituents may be labeled with the cause of the data density of the constituent. For example, first constituent 364 may be labeled "low server activity between hours of 2 o'clock a.m. and 3 o'clock a.m. The second constituent 366 may be labeled, "server failure increased activity on remaining servers." Thus, the constituents may be labeled with metadata (e.g., causation, timing, data point density, activity, etc.) about the data that has been selected. In one embodiment, the portion 362 can be slid to another region of the heat map to drill into that region.

Accordingly, portions of the heat map can be drilled into to illustrate the data with greater granularity. In addition to displaying the data in more detail, portions of the data can be selected to reveal information about the data, such as possible causes for the data. Additionally a multi-characteristic view of the data may be illustrates While this is example refers to a portion 362 of a circular heat map, the functionality described with respect to FIG. 3D may be used in conjunction with any of the embodiments described herein.

Figure 3F:
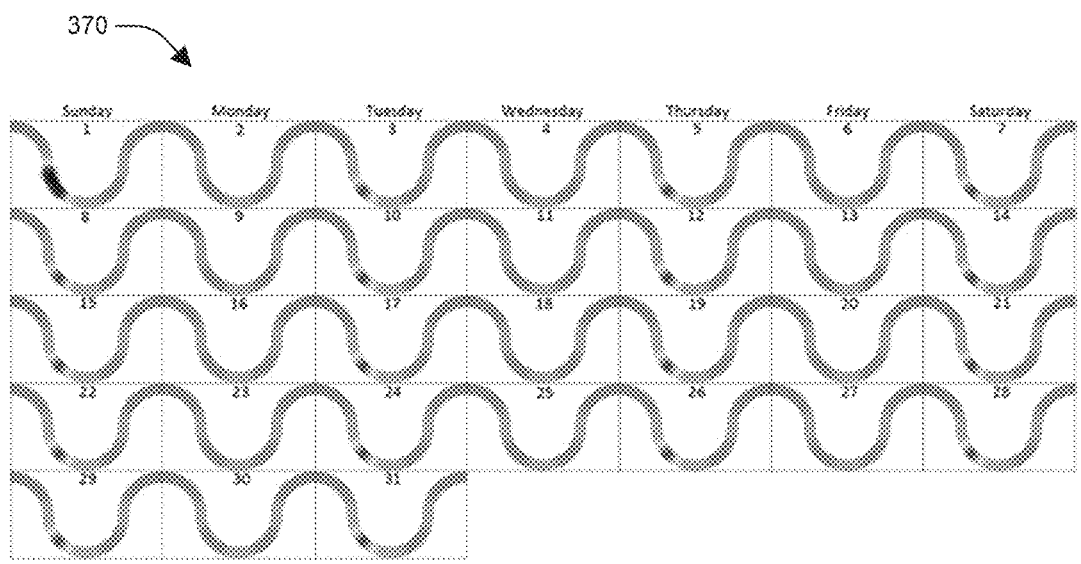
FIG. 3F illustrates one embodiment of a ribbon heat map illustrating data for a one month associated with density gradient analysis.

FIG. 3F illustrates one embodiment of a ribbon heat map illustrating data for a one month associated with density gradient analysis. As has been described, a ribbon heat map may be used to illustrate data for multiple days. Ribbon heat map 370 illustrates a month of data.

Figure 4:
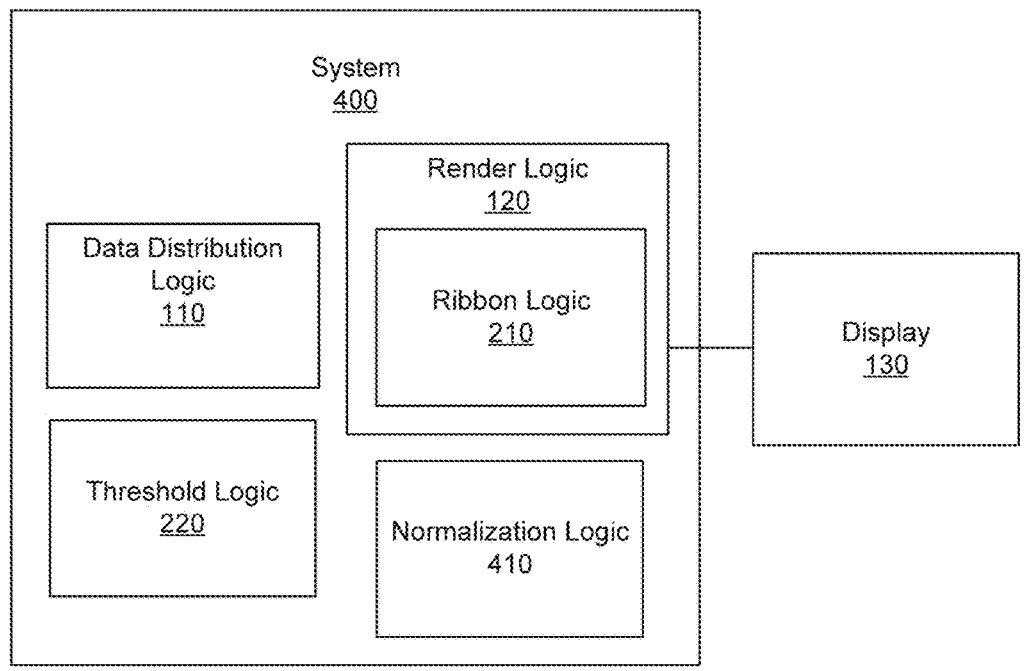
FIG. 4 illustrates another embodiment of a system associated with a density gradient analysis tool having a normalization logic.

FIG. 4 illustrates one embodiment of a system 400 associated with a density gradient analysis tool having a normalization logic 410. The data distribution logic 110, the render logic 120, the ribbon logic 210, the threshold logic 220, and the display 130 operate in a similar manner as described above with respect to FIG. 2.

The normalization logic 410 uses data from the data distribution to determine a statistical normalization for applying colors to the bins. Thus, the color threshold that defines which color should be assigned to a bin having a specified number of data points will be adjusted according to a scale. For example, assume that viewers find the following color distribution most helpful: approximately 68.2% of a heat map is green, 27.2% of the heat map is yellow, and 4.6% of the heat map is red. The normalization logic 410 adjusts the color threshold values in light of the data distribution so that a resulting heat map will reflect the desired color distribution. The normalization logic 410 operates to adjust the color threshold values in order to aid a viewer best utilize the resulting heat map.

In one embodiment, the normalization logic 410 calculates a standard deviation to identify normal ranges of operation in the data distribution. For example, a standard deviation calculation may establish three set points above and three set points below the average of the entire population of data points. Thus, these six points result in six different divisions. The entire population of the data can then be split into one of these six different divisions.

In one example, the first standard deviation from above or below the average point in the data contains 34.1% of the data points. Therefore, if the average is 50 and a standard deviation of 15, then 34.1% of the population of data will be within the range 50-65. Accordingly, on both sides of the average, 68.2% of the data points will be within 35-65 range. Thus, the normalization logic 410 defines a first normal as 34.1% on either side of the average. Also consider that a second normal includes 95.4% of the data points, a third normal includes 99.6% of the data points, and remaining 0.4% are considered outliers.

The threshold logic 220 may apply the standard deviation calculated by the normalization logic 410 to the color thresholds. For example, data points in the first normal may be assigned a green color, data points in the second normal but not included in the first normal may be assigned a yellow color, and data points in the third normal but not included in the first or second normal may be assigned a red color. In one embodiment, the normalization logic 410 is configured to recalculate standard deviation values at predetermined intervals to ensure that the data is still being correctly color coded. In the example described above in which data points correspond to activity on a server, consider that as a system is used more frequently, the server adapts to run more efficiently. Thus, what would previously be considered high server activity may be considered routine at a later date. Accordingly, bins having a high density at a first time may be considered lower density at a second time. Thus, the normalization logic 410 calculates a new normal to accommodate changes in the data distribution so that the changes can be reflected in a resultant heat map.

Figure 5:
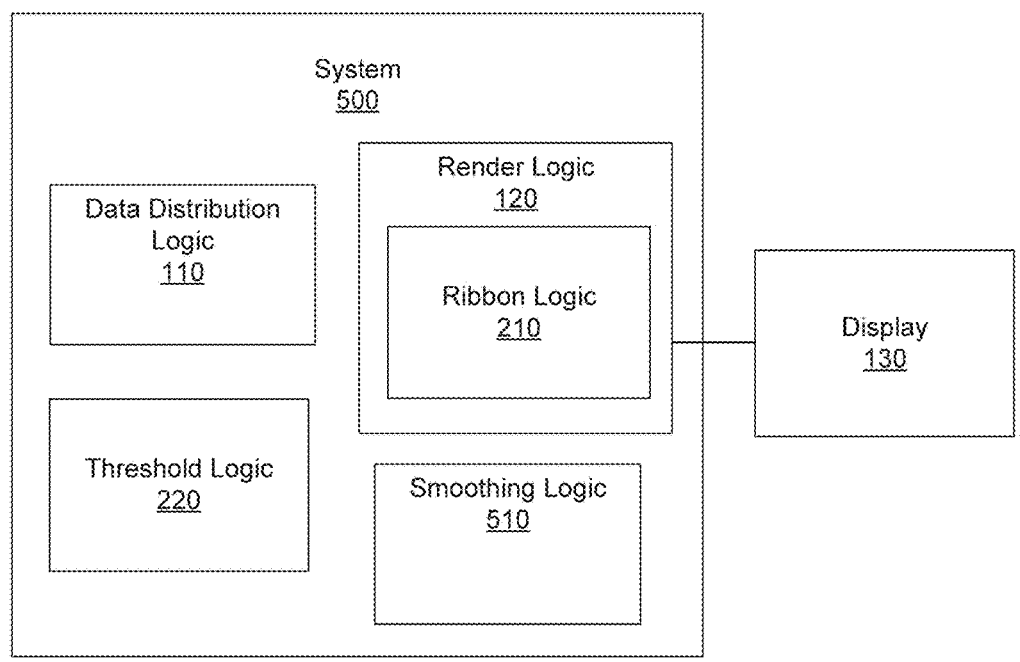
FIG. 5 illustrates one embodiment of a system associated with a density gradient analysis tool having a smoothing logic.

FIG. 5 illustrates one embodiment of a system 500 associated with a density gradient analysis tool having a smoothing logic 510. The data distribution logic 110, the render logic 120, the ribbon logic 210, the threshold logic 220, and the display 130 operate in a similar manner as described above with respect to FIG. 2.

In one embodiment, each section of a heat map is rendered with the color assigned by the threshold logic 220. Accordingly, there may be a sharp transitions when adjacent sections are different colors. The smoothing logic 510 smooths the transitions between sections of the heat map.

In the example given above with respect to FIG. 2, a circular heat map having 360 degrees is divided into twelve arc shaped sections representing the 12 bins of the data distribution. Thus, each section is 30 degrees. In one embodiment, the smoothing logic 510 identifies a portion of the section to be used for transition. For example, 60% of the section may be used for transition. The percentage of the section used for transition may be set by a viewer to either sharpen or smoothen transitions. The percentage of the section used for transition is multiplied by the number of degrees used to render the section. Accordingly, in the example given, a 30 degree section is multiplied by 60%, resulting in 18 degrees of a section being used for transition. However, a section of a circular heat map has two adjacent sections. Thus, only 9 degrees is used for transitioning between one section to the next in a circular heat map.

The smoothing logic 510 determines a number of color values between two different colors. For example, between green and yellow the render logic may have 50 shades of yellow-green corresponding to 50 different color values. Thus, the number of color values (i.e., 50) is divided by the number of degrees used for transition (i.e., 9) resulting in the number of color values each degree should be adjusted by, here, approximately 5. Accordingly, the smoothing logic 510 would adjust each degree of the first 9 degrees by five color values from the color value of the previous degree to smooth the transition between differently colored adjacent sections. Accordingly, the visual features of the resulting heat maps may be altered in order to allow a viewer to focus on relevant data characteristics rather than the manner in which the heat maps are rendered.

Figure 6:
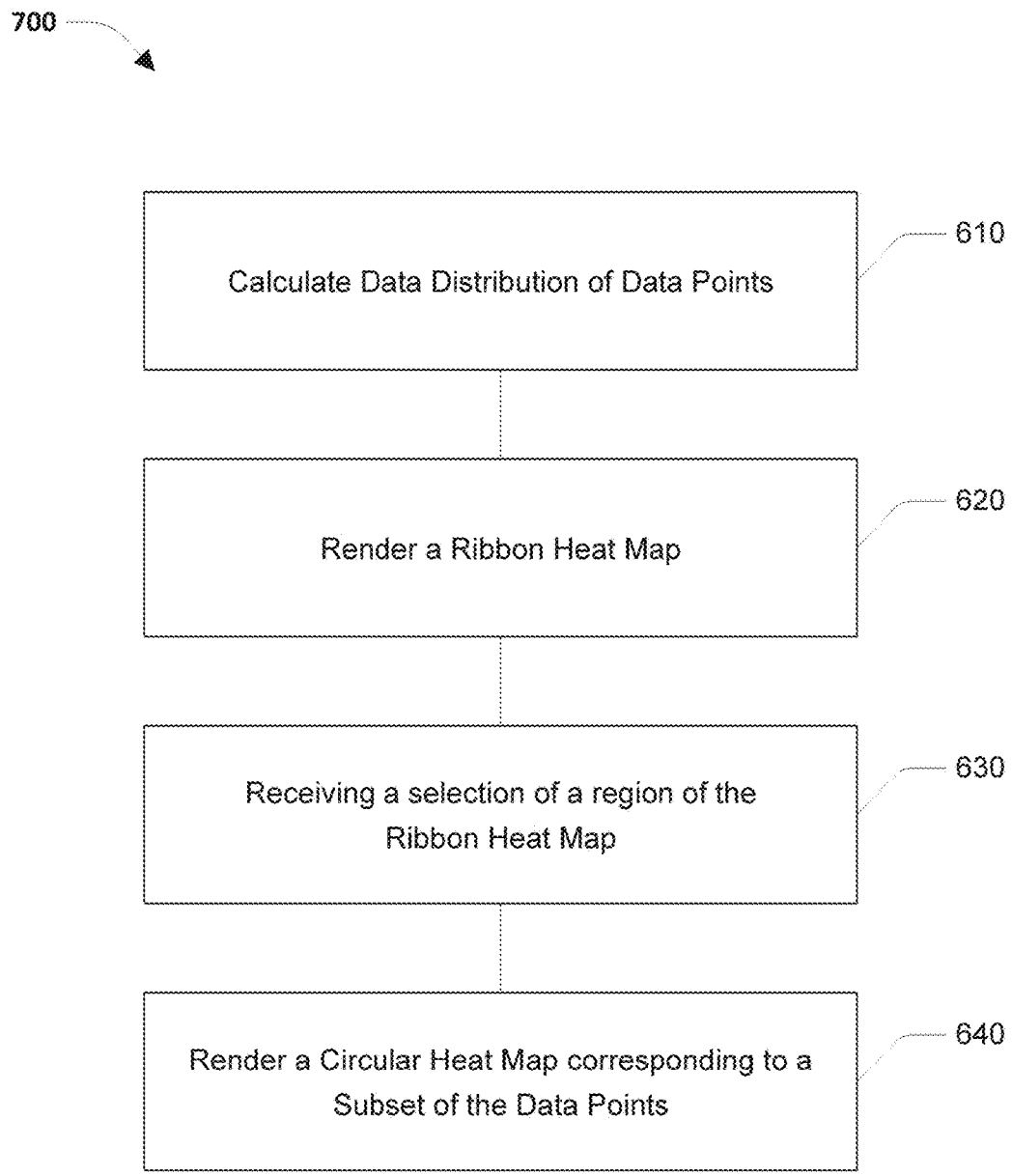
FIG. 6 illustrates one embodiment of a method associated with density gradient analysis.

FIG. 6 illustrates one embodiment of a method associated with density gradient analysis. At 610, a data distribution is calculated for a set of data points. The data points may be received as a result of request to review operational data regarding a system. At 620, a ribbon heat map is rendered to correspond to the set of data points. In one embodiment, the ribbon heat map includes regions. The regions may periodic such that the regions are approximately the same size and illustrated in a similar manner. For example, as described above, the ribbon heat map may be illustrated as a sinusoidal wave having periodic regions that are wavelengths of the sinusoidal wave.

At 630, a selection of a region of the periodic regions is received. For example, a user may select a region of the heat map that the user wishes to view in more detail. At 640, a circular heat map is rendered. The circular heat map corresponds to a subset of the data points represented in the selection of the region. Accordingly, by selecting the region of the heat map, a different type of heat map is rendered that allows the user to visualize the subset of data as a stand-alone heat map. Thus, the user can zoom in on the subset of data. In one example, different type of heat map that is rendered is a circular heat map.

As discussed above, colors may be assigned to the periodic regions based, at least in part, on a data point density of the periodic region. Moreover, the data distribution may be normalized such that the distribution of colors is also normalized. The ribbon heat map is then rendered with the assigned colors. In the same manner that the ribbon heat map has periodic regions, the circular heat map has intervals. The intervals correspond to portions of the subset of data points. The intervals of the circular heat map are also assigned colors based, at least in part, on the data point density of the intervals. The subset of data may also be normalized so that that the colors are assigned to the periodic regions based, at least in part, on the normalized data distribution of the subset of data points.

Figure 7:
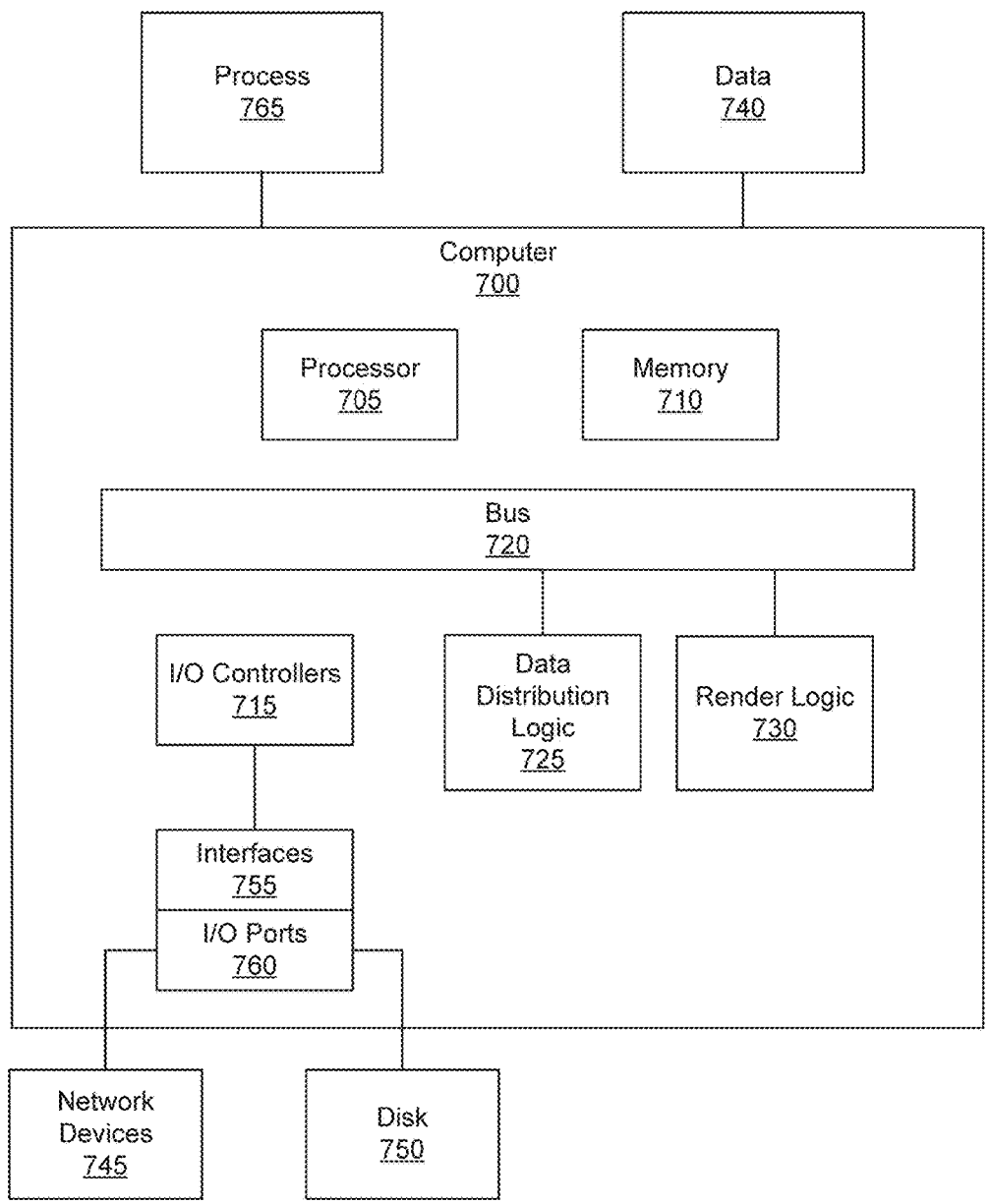
FIG. 7 illustrates one embodiment of an example computer environment associated with a density gradient analysis tool.

FIG. 7 illustrates one embodiment of an example computer environment associated with automated secondary linking of fraud detection systems. The computer environment in which the systems and methods described herein, and equivalents, may operate may include a computer 700. The computer includes a processor 705, a memory 710, and input/output (I/O) ports 715 operably connected by a bus 720. In one example, the computer 700 may include a data distribution logic 725 and a render logic 730. The data distribution logic 725 receives data and calculates a data distribution for the received data. The render logic 730 renders a heat map based on the calculated data distribution.

In different examples, the data distribution logic 725 and the render logic 730 may be implemented in hardware, a non-transitory computer-readable medium with stored instructions, firmware, and/or combinations thereof. While the data distribution logic 725 and the render logic 730 are illustrated as hardware components attached to the bus 720, it is to be appreciated that in one example, the data distribution logic 725 and/or the render logic 730 could be implemented in the processor 705.

In one embodiment, the data distribution logic 725 is a means (e.g., hardware, non-transitory computer-readable medium, firmware) for calculating a data distribution for received data The render logic 730 is a means (e.g., hardware, non-transitory computer-readable medium, firmware) for rendering a heat map based on the calculated data distribution. The means may be implemented, for example, as an ASIC programmed to facilitate data editing in a web-based interactive web response system. The means may also be implemented as stored computer executable instructions that are presented to computer 700 as data 740 that are temporarily stored in memory 710 and then executed by processor 705.

Generally describing an example configuration of the computer 700, the processor 705 may be a variety of various processors including dual microprocessor and other multi-processor architectures. The memory 710 may include volatile memory and/or non-volatile memory. Non-volatile memory may include, for example, ROM, PROM, and so on. Volatile memory may include, for example, RAM, SRAM, DRAM, and so on.

Network device 745 and a disk 750 may be operably connected to the computer 700 via, for example, an I/O interfaces (e.g., card, device) 755 and an I/O ports 760. The disk 745 may be, for example, a magnetic disk drive, a solid state disk drive, a floppy disk drive, a tape drive, a Zip drive, a flash memory card, a memory stick, and so on. Furthermore, the disk 745 may be a CD-ROM drive, a CD-R drive, a CD-RW drive, a DVD ROM, and so on. The memory 710 can store data 740 and/or a process 765, for example. The disk 750 and/or the memory 710 can store an operating system that controls and allocates resources of the computer 700.

The bus 720 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 720 can be types including, for example, a memory bus, a memory controller, a peripheral bus, an external bus, a crossbar switch, and/or a local bus.

The computer 700 may interact with I/O devices via the I/O interfaces 755 and the I/O ports 760. Input/output devices may be, for example, a keyboard, a microphone, a pointing and selection device, cameras, video cards, displays, the network devices 745, the disk 750, and so on. The I/O ports 760 may include, for example, serial ports, parallel ports, and USB ports.

The computer 700 can operate in a network environment and thus may be connected to the network devices 745 via the I/O interfaces 755, and/or the I/O ports 760. Through the network devices 745, the computer 700 may interact with a network. Through the network, the computer 700 may be logically connected to remote computers. Networks with which the computer 700 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a computer-readable medium, a floppy disk, a flexible disk, a hard disk, a magnetic tape, other magnetic medium, an ASIC, a CD, other optical medium, a RAM, a ROM, a memory chip or card, a memory stick, and other media that can store instructions and/or data. Computer storage medium described herein are limited to statutory subject matter under 35 U.S.C § 101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C § 101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein is limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method, comprising:
   receiving data points corresponding to a twenty-four hour time period;
   calculating a first data distribution of the data points;
   organizing the first data distribution into a first set of bins, wherein each bin has a data point density and represents an interval of time; and
   rendering a first circular heat map based, at least in part, on the first data distribution, wherein the heat map includes regions corresponding to the first set of bins;
   receiving a request to illustrate additional data points for a longer period of time;
   calculating an additional data distribution for the additional data points;
   organizing the additional data distribution into a second set of bins corresponding to the same interval of time as the first set of bins;
   transforming the first circular heat map to a ribbon heat map, wherein the ribbon heat map is based at least in part, on the first data distribution and the additional data distribution; and
   displaying the rendered ribbon heat map that includes distinct regions corresponding to the first and second sets of bins, wherein the ribbon heat map is a sinusoidal wave, wherein a wavelength of the sinusoidal wave corresponds to one of either the first or the second sets of bins.

2. The method of claim 1, further comprising:
   selecting a wavelength of the ribbon heat map, wherein the wavelength corresponds to the first or second sets of bins;
   rendering a second circular heat map corresponding to the corresponding first or second sets of bins; and
   displaying the second circular heat map.

3. The method of claim 2 wherein both the ribbon heat map and the second circular heat map are displayed together.

4. The method of claim 1, wherein the ribbon heat map illustrates multiple twenty-four hour time periods.

5. The method of claim 1, further comprising:
   assigning the regions a color based, at least in part, on the density of the bins, wherein rendering the heat map further includes coloring the regions with the assigned colors.

6. The method of claim 1, further comprising:
   defining thresholds for different values of the data point density;
   assigning each bin a threshold based, at least in part, on the data point density of the bin;
   assigning a region a color based, at least in part, on the assigned threshold of the bin corresponding to the region; and
   coloring the region with the assigned color.

7. The method of claim 6, further comprising:
   smoothing transitions between the colored regions in the heat map.

8. The method of claim 1, further comprising:
   normalizing the first data distribution; and
   assigning the regions colors based on a statistical normalization determined using the normalized distribution, wherein rendering the circular heat map further includes coloring the regions with the assigned colors, wherein the determining includes calculating a standard deviation to identify normal ranges of operation in the first data distribution and applying the standard deviation to the color thresholds.

9. The method of claim 8, wherein the standard deviation is calculated at standard intervals to ensure that the data is still being correctly color coded.

10. The method of claim 1, wherein the data points have characteristics, and wherein the characteristics are aggregated in the bins.

11. A system, comprising:
    a data distribution logic configured to:
      receive data points corresponding to a twenty-four hour time period;
      calculate a first data distribution of the data points;
      organize the first data distribution into a first set of bins, wherein each bin has a data point density and represents an interval of time;
    a render logic configured to render a first circular heat map based, at least in part, on the first data distribution, wherein the heat map includes regions corresponding to the first set of bins;
    wherein, the data distribution logic is further configured to:
      receive additional data points;
      calculate a second data distribution based, at least in part, on the additional data points,
      organize the second data distribution into a second set of bins corresponding to the same interval of time as the first set of bins,
    wherein the render logic is further configured to:
      transform the first circular heat map to a ribbon heat map based, at least in part, on the first data distribution and the second data distribution; and
    a display to display the rendered ribbon heat map, that includes distinct regions corresponding to the first and second sets of bins, wherein the ribbon heat map is a sinusoidal wave, wherein a wavelength of the sinusoidal wave corresponds to one of either the first or the second sets of bins.

12. The system of claim 11, where the data distribution logic is configured to calculate a value for data point density of each bin, the system further comprising:
    a threshold logic configured to:
      define thresholds corresponding to different values of the data point density, and
      assign a bin a color based, at least in part, on the value for the data point density of the bin and corresponding threshold;
    wherein the render logic is further configured to color a region with the color assigned to the bin represented by the region.

13. The system of claim 12, further comprising:
a smoothing logic configured to smooth transitions between colored regions in the first circular heat map.

14. The system of claim 13, wherein the smoothing logic is configured to determine a number of color values between two different colors.

15. The system of claim 12, further comprising:
a normalization logic configured to normalize the data distributions and use data from the normalized distributions to determine a statistical normalization for applying color to the bins, wherein the normalization logic calculates standard deviations to identify normal ranges of operation in the data distributions; and
wherein the threshold logic is configured to define the thresholds based, at least in part on the normalized data distributions, wherein the threshold logic applies the standard deviations to the color thresholds.

16. The system of claim 11, wherein the data distribution logic is further configured to receive a request selecting a wavelength of the ribbon heat map, wherein the wavelength corresponds to the first or second sets of bins; and
the rendering logic is further configured to render a second circular heat map corresponding to the corresponding first or second sets of bins,
wherein the display displays the second circular heat map.

17. The system of claim 11, wherein the data points are associated with a day of a week, wherein the interval is fifteen minutes, and wherein the data distribution logic is further configured to aggregate data points into an appropriate interval for an appropriate of day of the week for a data point.

18. A non-transitory computer-readable medium storing computer-executable instructions that when executed by a computer cause the computer to perform a method, the method comprising:

receiving a set of data points representing multiple twenty-four hour periods;

calculating a data distribution for the set of data points;

organizing the data distribution into a set of bins, wherein each bin has a data point density and represents a single twenty-four hour period;

rendering a ribbon heat map corresponding to the set of data points, where the ribbon heat map comprises periodic regions;

receiving a selection of a region of the periodic regions, wherein the region corresponds to a subset of the set of data points; and rendering a circular heat map representing a single twenty-four hour period.

19. The non-transitory computer-readable medium of claim 18, further comprising:

assigning the regions a color based, at least in part, on the density of the bins, wherein rendering the heat map further includes coloring the regions with the assigned colors.

20. The non-transitory computer-readable medium of claim 18, further comprising:

defining thresholds for different values of the data point density;

assigning each bin a threshold based, at least in part, on the data point density of the bin;

assigning a region a color based, at least in part, on the assigned threshold of the bin corresponding to the region; and coloring the region with the assigned color.

* * * * *